(12) United States Patent
Kuenzner et al.

(10) Patent No.: US 6,906,634 B1
(45) Date of Patent: Jun. 14, 2005

(54) INDICATING DEVICE

(75) Inventors: Hermann Kuenzner, Freising (DE); Michael Heimrath, Fuerstenfeldbruck (DE); Swantje Roessner, Munich (DE); Volker Hellwig, Stuttgart (DE)

(73) Assignee: Bayerische Motoren Werke AG, Munich (DE)

( * ) Notice: Subject to any disclaimer, the term of this patent is extended or adjusted under 35 U.S.C. 154(b) by 25 days.

(21) Appl. No.: 10/088,741

(22) PCT Filed: Aug. 26, 2000

(86) PCT No.: PCT/EP00/08316
§ 371 (c)(1),
(2), (4) Date: Jul. 25, 2002

(87) PCT Pub. No.: WO01/23205
PCT Pub. Date: Apr. 5, 2001

(30) Foreign Application Priority Data

Sep. 25, 1999 (DE) .......................... 199 46 012

(51) Int. Cl.⁷ ............................... G08B 5/24
(52) U.S. Cl. ..................... 340/815.78; 340/815.73; 340/688; 362/23; 362/27
(58) Field of Search ............... 340/815.73, 815.76, 340/815.78, 461, 688, 815.17, 815.42, 815.45, 815.55, 815.58, 815.83, 753, 754; 362/23, 27, 559; 345/200, 685

(56) References Cited

U.S. PATENT DOCUMENTS

| | | | | |
|---|---|---|---|---|
| 4,376,934 A | * | 3/1983 | Prohaska et al. | ...... 340/815.76 |
| 4,814,757 A | * | 3/1989 | Patterson et al. | ............. 345/40 |
| 4,935,850 A | * | 6/1990 | Smith, Jr. | ..................... 362/27 |
| 5,523,922 A | | 6/1996 | Kato | ........................... 362/23 |
| 6,379,015 B2 | * | 4/2002 | Wilhelm et al. | ............. 362/23 |
| 6,633,811 B1 | * | 10/2003 | Aumayer | .................... 701/207 |

FOREIGN PATENT DOCUMENTS

| | | |
|---|---|---|
| DE | 3407942 A1 | 10/1985 |
| DE | 3714072 A1 | 11/1988 |
| DE | 3732144 A1 | 4/1989 |
| DE | 29704844 U1 | 8/1994 |
| DE | 29714341 U1 | 11/1997 |
| DE | 19755470 A1 | 9/1998 |
| DE | 19733 650 A1 | 2/1999 |
| EP | 0939301 A1 | 9/1999 |

OTHER PUBLICATIONS

Magnified Slider Control—Magnified Dial Control. *IBM Technical Disclosure Bulletin*, vol. 36, Aug. 1993, No. 8, S. 9–10.
German Office Action.
International Search Report.

* cited by examiner

*Primary Examiner*—Van T. Trieu
(74) *Attorney, Agent, or Firm*—Crowell & Moring LLP

(57) ABSTRACT

A display device includes having a display unit which comprises a scale with graphic information and an indicator element which can be aligned as a function of at least one input parameter with a position of the scale. In order to ensure a better readability particularly in the case of small display devices, the display of the graphic information is changed in an area around the momentary position of the indicator element in comparison to a normal display.

22 Claims, 2 Drawing Sheets

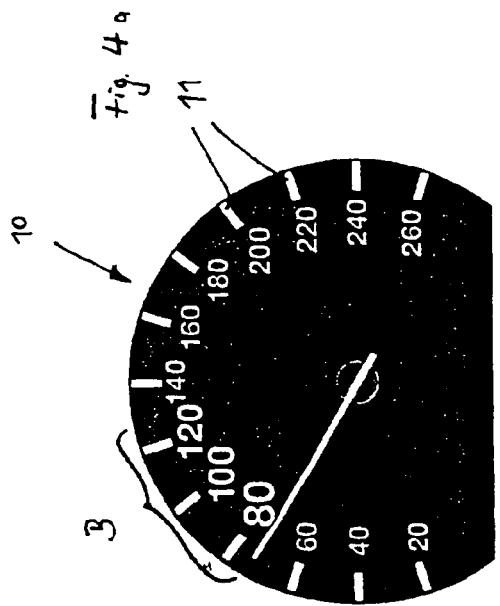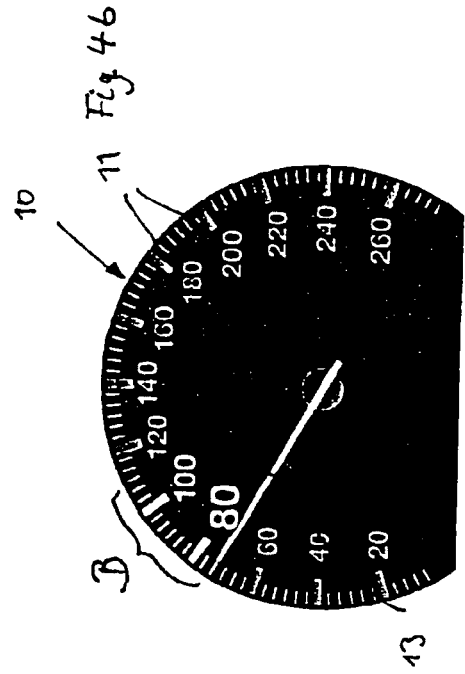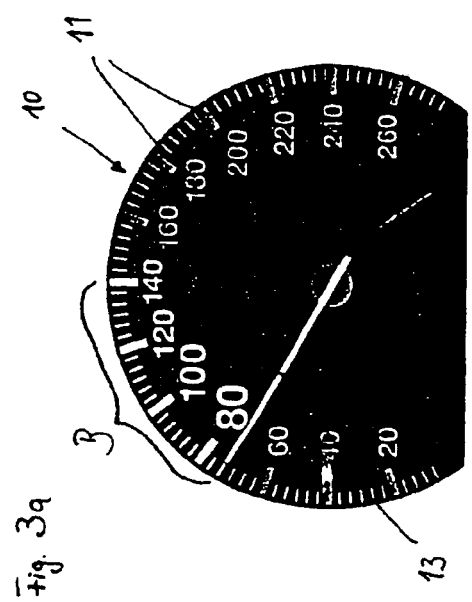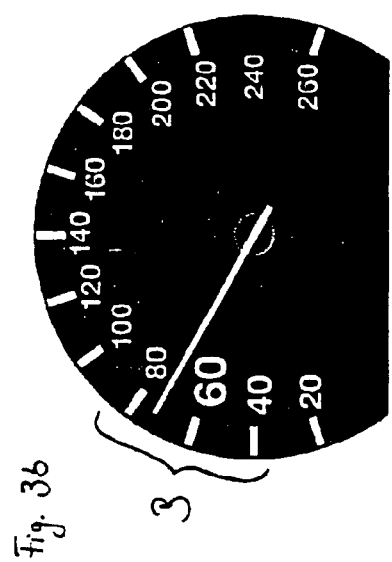

INDICATING DEVICE

BACKGROUND AND SUMMARY OF THE INVENTION

The invention relates to a display device and a display method.

Display devices with scales, which graphically display information, are used in all fields of technology and inform people of many different conditions of machines and equipment and about many different circumstances. A very narrow application involves the vehicle, where vehicle operating conditions are provided to the vehicle operator by display devices. Although it will be described relative to this field, the present invention should not be so limited.

How much space for the transmission of information is available depending on the local situations and the extent of the display. In the case of vehicles, for example, an increasing number of scale marks must be shown in the area of speedometer readings as a result of higher maximum speeds. Furthermore, the available space is increasingly reduced because of additional display devices, such as the rotational speed, the tank, the navigation devices, etc. On the whole, the display units are therefore becoming smaller and are consequently more difficult to read. For older far-sighted persons or with a quick glance, the displayed information may be difficult to recognize. Similar problems also occur in other areas where generally little space is available for display instruments.

It is an object of the invention to further develop a display device of the above-mentioned type where the information displayed can be absorbed rapidly and reliably.

A core idea of the invention is to change and emphasize the representation of the graphic information in an area where the actual position of the indicator element is. The type of the changes can be freely selected. In particular, it is possible to enlarge the graphic information, to show it with a higher contrast, to indicate it in a different color or to displace it.

For example, normal indicator needles or graphic indicators (such as marks in the scale) can be used as the indicator element.

As a result of the emphasis, a viewer is automatically directed to the area of the scale where the indicator element is situated. As a result, he can rapidly and reliably recognize the information supplied by the indicator element.

In a particularly preferred embodiment of the invention, the emphasized area is selected as a function of input information. In particular, the size and position of the area can be changed. By changing the area, additional information can be transmitted, for example, information concerning due movements of the indicator element.

In addition, or as an alternative, to the change of the area, the display of the graphic information in the area itself can also be changed. These changes may be predefined or be made a function of parameters. If the emphasizing is generated by enlargements of the graphic information, a decrease of the enlargement, for example, can take place with an increasing distance from the indicator element. As an alternative, a change of color or position depending on the distance of the indicator element is also possible.

A particularly advantageous embodiment can be implemented by a video screen display as an indicator unit. On the display, the graphic information can be changed in a simple manner. In contrast to a normal instrument dial indication, it is possible in a simple manner for a video screen display to show numbers or letters in an enlarged fashion, in color or displaced. The display unit, particularly the video screen display, is preferably controlled by a control device. The required parameters are fed to the control device, are processed by it and are transmitted in a processed form to the display unit.

A useful application of the invention is in the area of a vehicle instrument. For example, the speedometer can be constructed in the manner described above.

The invention will be described in the following with respect to a speedometer and with respect to the attached drawings.

BRIEF DESCRIPTION OF THE DRAWINGS

FIGS. 3a and 3b, as well as FIGS. 4a and 4b, are representations as shown in FIG. 2 where the areas in which the enlargements take place are changed.

DETAILED DESCRIPTION OF THE DRAWINGS

Figure 1:
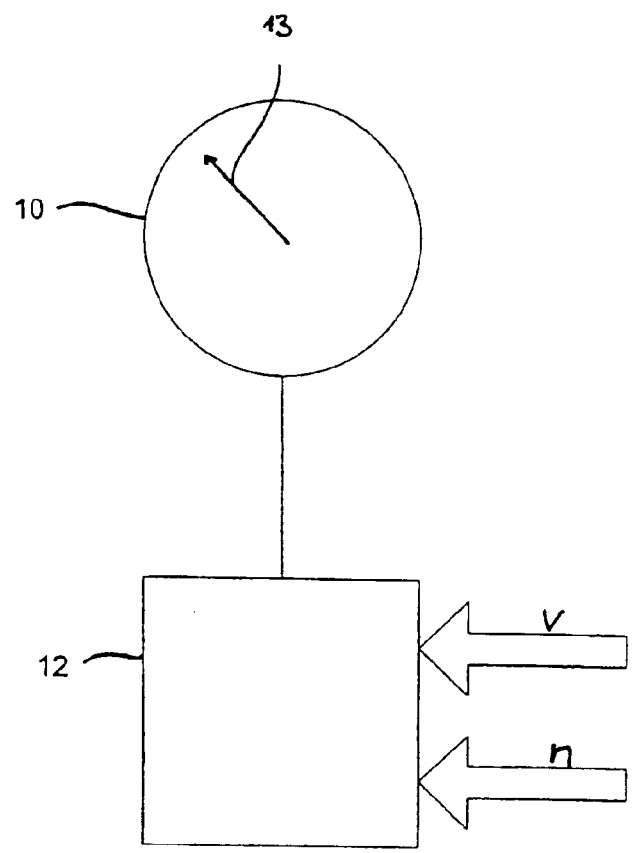
FIG. 1 is a simple schematic diagram of an embodiment of the invention.

FIG. 1 is a schematic view of a video screen display 10 which is connected with a control device 12. The control device 12 receives input information, such as vehicle speed v and rotational engine speed n.

On the video screen display 10, an indicator 13 is shown which indicates the vehicle speed v on a scale 11 (not shown in FIG. 1). In addition to scaling lines, the scale 11 has number presentations which explicitly indicate the speed in km/h. Using the scaling and the numbers on the video screen display 10, the information can be displayed in different sizes and positions.

Conventionally, all information over the entire scale is indicated in a uniform size.

Figure 2:
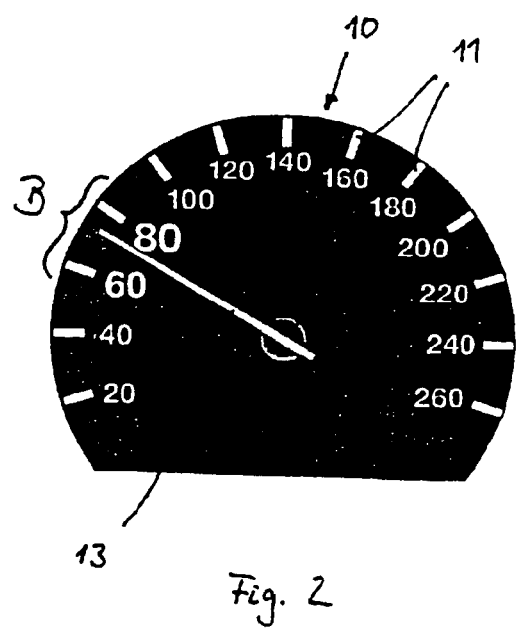
FIG. 2 is a representation of a speedometer whose scale is enlarged according to the invention around the indicator element.

According to the invention, as shown in FIG. 2, an area B is defined around the actual position of the indicator 13, in which the numbers are shown in an enlarged manner (compare FIG. 2). The size of the enlargement depends on the distance of the respective number from the momentary indicator position. According to FIG. 2, number 80 is shown to be the largest and number 60 is the second largest. All other numbers have the normal size. The area B is determined by the control device 12 on the basis of the input parameters v and n and is placed symmetrically around the actual indicator position.

Naturally, the emphasizing on the video screen display can also be implemented by shifts of the information, color changes or a higher contrast.

As a result of the emphasis, a driver, when briefly looking at the speedometer, is automatically directed to the enlarged area so that he can easily and rapidly detect the speed information specified more precisely by the indicator 13.

FIGS. 3a, 3b, 4a and 4b illustrate how additional information can be transmitted by the selection of the area of emphasis.

In the case of acceleration, the area is shifted toward the higher speeds, as shown in FIG. 3a, so that the speeds are emphasized in an area toward which the indicator 13 is moving. In the embodiment according to FIG. 3a, the area B starts at the indicator 13 and is oriented toward the higher speeds.

Analogously, during braking operations, the area B is shifted toward lower speeds, as shown in FIG. 3b. In this case, the size of the enlargement is again dependent on the distance of the number information from the actual indicator position. On the whole, in the embodiments shown in FIGS. 3a and 3b, the area is shifted around the actual indicator position depending on the driving dynamics.

However, it is not only the location of the area B that can be changed. The extent or dimension of the area B can also be adjusted. In FIGS. 4a and 4b, the size of the area of emphasis depends on the extent of the acceleration. In the case of higher acceleration (FIG. 4a), the emphasized area B is larger than in the case of less acceleration (FIG. 4b).

To this extent, an area of emphasis around the actual indicator position looks ahead toward a future driving speed, so that an acknowledgment can be made concerning the extent of the speed change. This acknowledgment is particularly clear when scale lines are used in addition to the numbers for indicating the prediction (see, for example, FIGS. 3a and 4b).

On the whole, in the case of the above-mentioned embodiments, also when a display surface is small, important information can be displayed such that it can be absorbed at a brief glance. This is of special interest also for persons who do not have perfect vision.

The present invention can be used wherever a simple and rapid information transmission is important in the case of a display device. In this respect, the invention is not limited to the present embodiment.

What is claimed is:

1. A display device having a display unit, comprising a scale with graphic information and an indicator element which is aligned as a function of at least one input parameter with a position of the scale, wherein a display of the graphic information in an area around a momentary position of the indicator element is emphasized in comparison with a normal display, wherein the area is defined by a lower limit and an upper limit, and wherein both the lower and upper limits are moveable with the position of the indicator element.

2. The display device according to claim 1, wherein the area is selected as a function of the input parameter.

3. The display device according to claim 2, wherein a control device is provided which receives the input parameter and is connected with the display unit.

4. The display device according to claim 1, wherein the display of the graphic information within this area is selected in a pre-determined manner.

5. The display device according to claim 4, wherein a change is defined by at least one of an enlargement, a different contrast, a different color and a shift.

6. The display device according to claim 1, wherein a video screen display is used as the display unit.

7. The display device according to claim 1, wherein the display unit is configured as a round instrument.

8. The display device according to claim 1, wherein the display unit includes a speedometer of a vehicle.

9. A display device comprising:
a scale having graphic information; and
an indicator element, the position of the indicator element relative to the scale being a function of a parameter to be displayed, wherein the graphic information in an area around the position of the indicator element is emphasized, wherein the area is defined by a lower limit and an upper limit, and wherein both the lower and upper limits are moveable with the position of the indicator element.

10. The display device according to claim 9, wherein a characteristic of the area varies with a characteristic of the parameter.

11. The display device according to claim 10, wherein the size of the area varies with the rate of change of the parameter.

12. The display device according to claim 10, wherein the location of the area varies with the rate of change of the parameter.

13. The display device according to claim 9, wherein the graphic information in the area is enlarged.

14. The display device according to claim 9, wherein the graphic information in the area is emphasized by a different contrast.

15. The display device according to claim 9, wherein the graphic information in the area is emphasized by a different color.

16. A method of displaying a parameter on a display device including a scale with graphic information, and an indicator element, the position of the indicator element relative to the scale being a function of a parameter, the method comprising:
emphasizing the graphic information in an area around the position of the indicator element, and
defining the area with a lower limit and an upper limit, wherein both the lower and upper limits are moveable with the position of the indicator element.

17. The method according to claim 16, comprising:
varying a characteristic of the area with a characteristic of the parameter.

18. The method according to claim 17, wherein the step of varying the characteristic of the area includes varying the size of the area with the rate of change of the parameter.

19. The method according to claim 17, wherein the step of varying the characteristic of the area includes varying the location of the area with the rate of change of the parameter.

20. The method according to claim 16, wherein the step of emphasizing the graphic information includes enlarging the graphic information in the area.

21. The method according to claim 16, wherein the step of emphasizing the graphic information includes emphasizing the graphic information by a different contrast.

22. The method according to claim 16, wherein the step of emphasizing the graphic information includes emphasizing the graphic information by a different color.

* * * * *